United States Patent [19]
Croisier

[11] 3,938,079
[45] Feb. 10, 1976

[54] ANTI-THEFT DEVICE FOR A VEHICLE

[76] Inventor: Jean-Paul Croisier, 27 rue Charles Boisser, 1223 Cologny, Switzerland

[22] Filed: Mar. 27, 1974

[21] Appl. No.: 455,189

[30] Foreign Application Priority Data
Mar. 27, 1973 Switzerland.......................... 4393/73

[52] U.S. Cl.................. 340/64; 307/10 AT; 200/43
[51] Int. Cl.$^2$.......................................... B60R 25/10
[58] Field of Search ........ 340/63, 64; 200/42 R, 43, 200/44, 45, 61; 307/10 AT; 180/114

[56] References Cited
UNITED STATES PATENTS

| | | | |
|---|---|---|---|
| 2,583,752 | 1/1952 | Smith | 340/64 |
| 3,624,602 | 11/1971 | LeDoux | 340/63 |
| 3,697,945 | 10/1972 | Comber | 340/64 |

Primary Examiner—Alvin H. Waring
Attorney, Agent, or Firm—Irving M. Weiner

[57] ABSTRACT

An anti-theft device for a vehicle whereby when the driver sets the correct combination on two knobs on a dashboard casing, he switches off the circuit supplying electrical power to the ignition device. In addition, by so doing the driver also switches on an anti-theft device which causes the emission of an alarm signal in the event of a thief attempting to short-circuit the power switch, or open the engine hood, or the lid of the luggage trunk, or any door of the vehicle. The anti-theft device does not require any switch key.

8 Claims, 4 Drawing Figures

ANTI-THEFT DEVICE FOR A VEHICLE

The present invention relates to an anti-theft device of a new type for motorcars and other vehicles.

BACKGROUND OF THE INVENTION

The anti-theft device known heretofore lock the steering wheel of a vehicle as long as the user does not turn the switch key in the direction necessary to start the engine. It is known that with such devices it is easy to start the engine without using the switch key. As a matter of fact, it is only necessary to cut off the wires connected to the terminals of the known anti-theft device, and then to short-circuit them.

An object of the present invention is to obviate such drawbacks of the known devices by providing a simple and inexpensive device which prevents the electric start of the engine by releasing or activating an alarm in the event of an attempt to steal the car.

SUMMARY OF THE INVENTION

The present invention provides an anti-theft device for a vehicle, including a first casing disposed in the engine compartment of the vehicle, and a second casing disposed in the dashboard of the vehicle. A multi-lead electric cable is operably and electrically connected between the first casing and the second casing. Means are provided such that an alarm signal is emitted and the ignition circuit is switched off when a thief attempts to switch on the power switch or cut the multi-lead electric cable, or open the hood of the engine compartment, or open the lid of the luggage trunk, or open any door of the vehicle.

An anti-theft device for a vehicle according to the invention is characterized in that it comprises a first casing fixed inside the engine compartment, and which is connected by a cord or cable having several leads to a second casing mounted in the dashboard, while means are provided such that a warning signal is emitted and the ignition circuit for the engine is cut off as soon as a thief attempts to switch on the general circuit, or to cut the cord, or else to open the hood or bonnet of the vehicle.

According to another feature of the invention, the electric wire allowing the supply of electric power to the ignition device for the engine follows the following path;

it starts from a first terminal of the battery of the vehicle, and leads to a hand power switch, starts again from said switch and enters inside the casing in the engine compartment, where it leads to a contactor controlled by electric means, starts again from said contactor to enter the casing on the dashboard while passing inside the cord which connects the two casings, comes back into the casing in the engine compartment, while passing still inside the cord connecting the two casings, leaves the casing in the engine compartment and, at last, reaches the ignition device.

Owing to the back and forth path of the wire between the two casings, any cutting of the cord or cable which connects said two casings cuts at the same time the wire and, consequently, the ignition circuit to the engine.

According to another feature of the invention, the contactor has three states of equilibrium, to wit:

a first state, or operative state, when the vehicle is running, at which time the contactor closes the contact between the positive terminal of the battery on the vehicle and the ignition device, while the main contact is closed;

a state of rest, the main contact being then open;

a third state, wherein it closes the contact between the positive terminal of the vehicle battery and an alarm device in order that the latter may emit its signal when a thief attempts to set the main contact again to start the engine.

According to an additional feature of the invention, the third state of equilibrium of the contactor allows, besides, cutting off the supply circuit to the ignition device as soon as the thief sets the main contact.

According to a further feature of the invention, the selection between the two first states of equilibrium is made through a knob located on the casing on the dashboard, said knob being adapted to take several positions, only one of which makes it possible to pass from one state to the other, said position corresponding to the state of rest, while all the other positions correspond to the first state.

According to a further feature of the invention, the contactor shifts automatically to the third state as soon as a thief attempts to set the main contact again while the contactor is in its state of rest.

According to a further feature of the invention, a bimetallic strip allows, at the end of a predetermined period of time, returning the contactor to its state of rest when it is in its third state.

According to an additional feature of the invention, the contactor is a two-contact relay, the contacts of which are adapted to take two positions.

According to a further feature of the invention, an additional electric circuit allows shifting the contactor to its third state when it is in its state of rest, such shifting taking place as soon as a thief attempts to open the hood or bonnet of the vehicle, while a knob located on the casing on the dashboard allows neutralizing said shifting when repairs to the engine must be effected, said knob being adpated to take several positions, one of which only corresponds to said neutralization.

According to a further feature of the invention, the additional circuit allows, besides, bringing the contactor to its third state when it is in its state of rest, as soon as the cord connecting the two casings is cut off.

According to a further feature of the invention, the additional circuit is constituted by at least one mocroswitch which closes as soon as the bonnet or engine hood opens, and one transistor which controls the power supply to a two-contact relay, said transistor being blocked as long as the cord or electric cable is not cut, while, when the cord is cut, said transistor is released, and supplies the relay, the latter supplying in turn the relay of the contactor which thus shifts from its state of rest to its third state.

According to a further feature of the invention, the power switch is mounted on the casing on the dashboard together with the switch controlling the relay of the starter, this arrangement making it possible to avoid the necessity of a switch key.

According to a further feature of the invention the casing in the engine compartment contains the two relays, together with the alarm, the latter being an audible alarm.

According to a further feature of the invention, the knobs disposed on the casing inserted in the dashboard of the vehicle are provided with skirts including numbers or digits along the periphery thereof, while only the correct combination allows starting the engine.

According to an additional feature of the invention, the casing is provided with a control light power-supplied from the lighting circuit of the dashboard, said control light allowing reading in the dark the numbers on the knobs of the casing.

DETAILED DESCRIPTION

Figure 1:
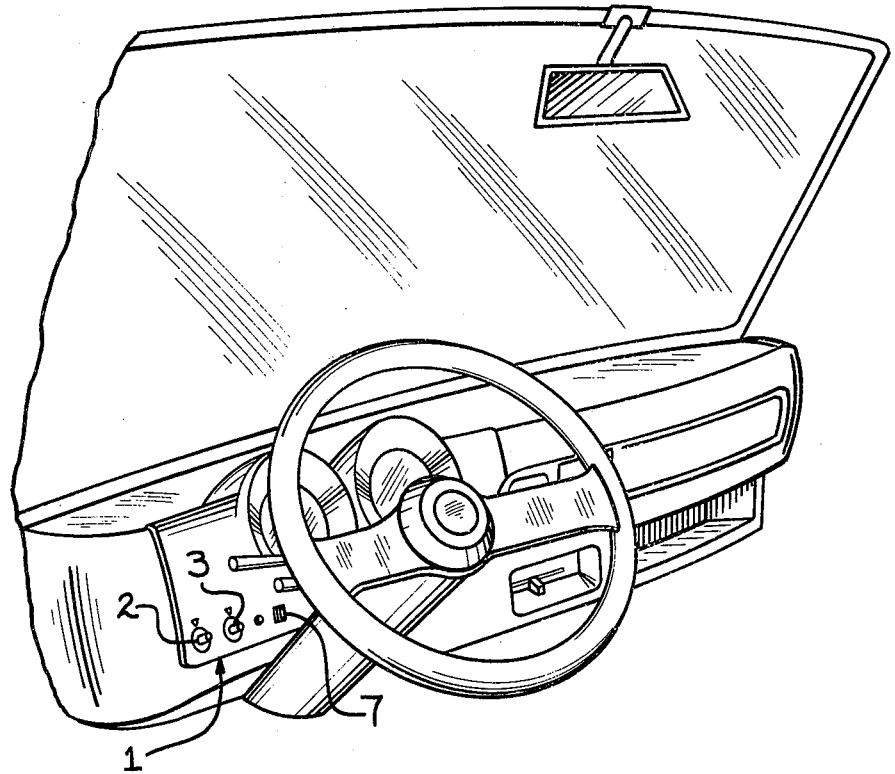
FIG. 1 shows the dashboard of a vehicle provided with an anti-theft device according to an embodiment of the present invention.

In the drawings, FIG. 1 shows a vehicle dashboard provided with the dashboard casing 1. To clarify the description, said casing 1 includes only two knob mechanisms or knobs 2 and 3 are provided with skirts 4 and 5, respectively, which include figures or digits 8 along their periphery. A power switch 7 is mounted on the casing 1.

Figure 2:
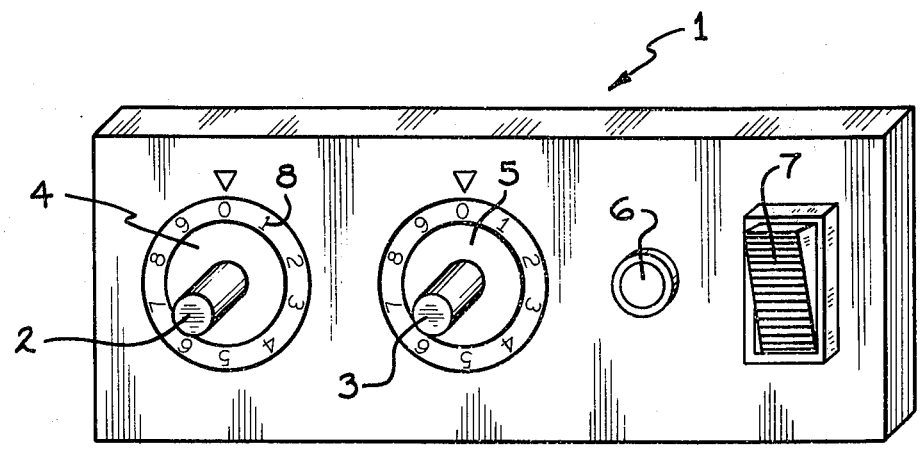
FIG. 2 shows a novel casing which is inserted in the dashboard.

A control light 6 is inserted in the casing 1 and is supplied from the lighting circuit for the dashboard (FIG. 2).

A casing 9 (FIG. 3) is mounted in the engine compartment. It contains:
one solid state electronic switching device, such as a transistor 10,
one relay 11 having two contacts 12 and 13,
one relay 16 having two contacts 14 and 15,
an alarm 18,
one bimetallic strip 17 adapted to open the contact 19 at the end of a predetermined period of time, and
two resistors 20 and 24.

The electric parts contained in the first casing 9 are power-supplied from the negative terminal of a battery 22 of the vehicle, via the power switch 7 and a fuse 21. A wire 25 allows the supplying of power to the control light 6 mounted on the casing 1.

A wire 26 leads to the engine ignition device, while a wire 27 allows the grounding or earthing of the casing 9. A wire 28 leads to a microswitch 23 which closes as soon as the bonnet or hood of the vehicle is lifted.

Each knob 2 and 3 includes, inside the second casing 1, a small, circular metal plate 29 and 30, respectively.

The two casings 1 and 9 are interconnected by a cord or cable 31 which contains the following leads:

a lead 33, which allows earthing or grounding of the base of the transistor 10.

a lead 34, which allows putting the resistor 20 in parallel with the coil of the relay 16, a lead 35 through which the power supply to the relay 11 takes place, the lead 26, which merely goes back and forth between the casings 1 and 9, and the lead 25 through which the power supply to the control light 6 takes place.

All said leads lead to a terminal block 32, which allows making contact between each wire and the corresponding wire on the casing 9.

Figure 3:
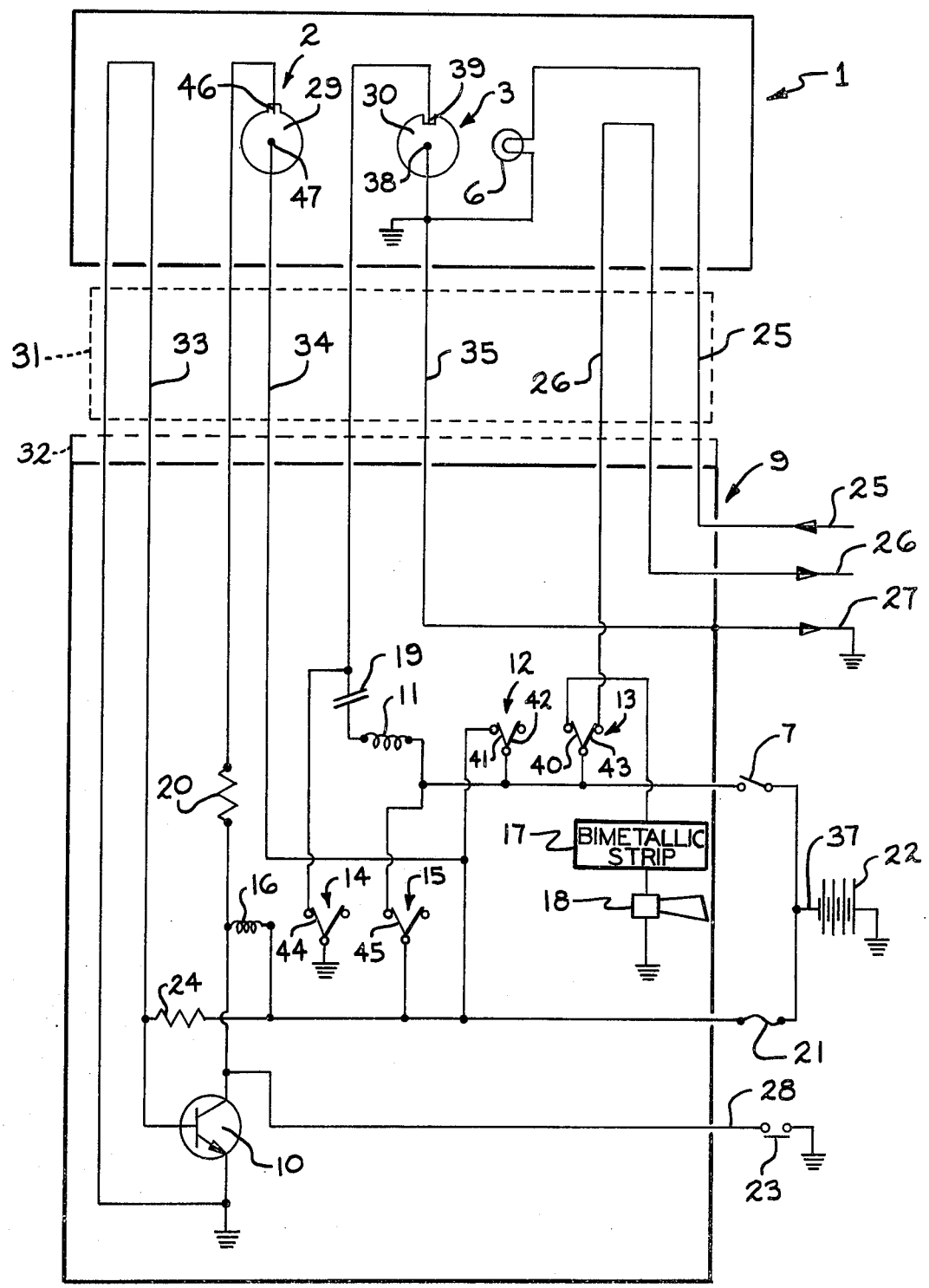
FIG. 3 is a block diagram of the electric circuit of an anti-theft device according to a first embodiment of the present invention.

The operation is as follows:

When the vehicle is running, the knob 3 is in a position such that the notch in its small circular plate 30 cuts off the lead 35. Thus, the coil of the relay 11 is not energized, and the contacts 12 and 13 are in the position of rest as shown in FIG. 3. The power supply to the ignition device to which the lead 26 leads can then take place through the contact 13. It is only necessary to close the power switch 7 to cause said supply to take place.

When the driver wants to stop his engine, he opens the power switch 7. Moreover, in order to switch on the antitheft device, he jams the combination indicated by the knob 3 in a manner such that the small circular plate 30 makes contact between its two terminals 38 and 39.

Under such conditions, three cases may occur if there is a breach:

if the thief attempts to close the power switch 7, the coil of the relay 11 is power-supplied and the contacts 12 and 13 take the respective positions 41 and 40 (FIG. 3) which correspond to the third state of the contactor. The alarm 18 is then power-supplied through the bimetallic strip 17 which, after a predetermined period of time cuts the supply to the coil of the relay 11, through the switch 19. The contacts 12 and 13 come back then to their positions of rest 42 and 43 (FIG. 3), which cuts off the emission of the warning signal. Said emission can last for all the period of time set by the bimetallic strip 17, as the contact 12 is a self-holding contact which remains closed even if the power switch 7 is opened again after being closed for a very short time. The emission will occur as many times as the thief will attempt to close the power switch 7;

if the thief cuts the cord 31, the two leads 26 and 33 are cut as well. The engine ignition device is therefore not supplied any longer. Moreover, as a result of the lead 33 being cut, the transistor 10 shifts from its blocked state to its conducting state. The coil of the relay 16 is therefore supplied through the transistor 10 and the contacts 14 and 15 thereof will be placed in the positions 44 and 45, respectively. The coil of the relay 11 is power-supplied as well, and the same process as described previously is started; and/or if the thief attempts to open the bonnet or hood of the vehicle, the microcontact 23 closes, and the coil of the relay 16 is supplied through the fuse 21. The contacts 14 and 15 are in the respective positions 44 and 45 (FIG. 3) and the same process as described previously is started.

In order to prevent the warning signal from being emitted when repairs on the engine are required, the knob 2 allows neutralizing the effect of the microswitch 23. As a matter of fact, if the small tongue provided on the circular plate 29 is disposed under the contact 46, the resistor 20 is brought into parallel with the coil of the relay 16, said coil having a resistance higher than that of the resistor 20. so that the current flowing therethrough is not sufficient for enabling said coil to attract the contact 14 and 15. No warning signal, therefore, is emitted in spite of the microswitch 23 closing as a result of the bonnet or automobile hood being opened.

When the driver wants to start his engine, it is only necessary for him to dispose the notch in the small plate 30 under the contact 39, so as to cut out the lead 35. He can then close the power switch 7 without the alarm signal being emitted, and act on the switch controlling the electric starter.

Figure 4:
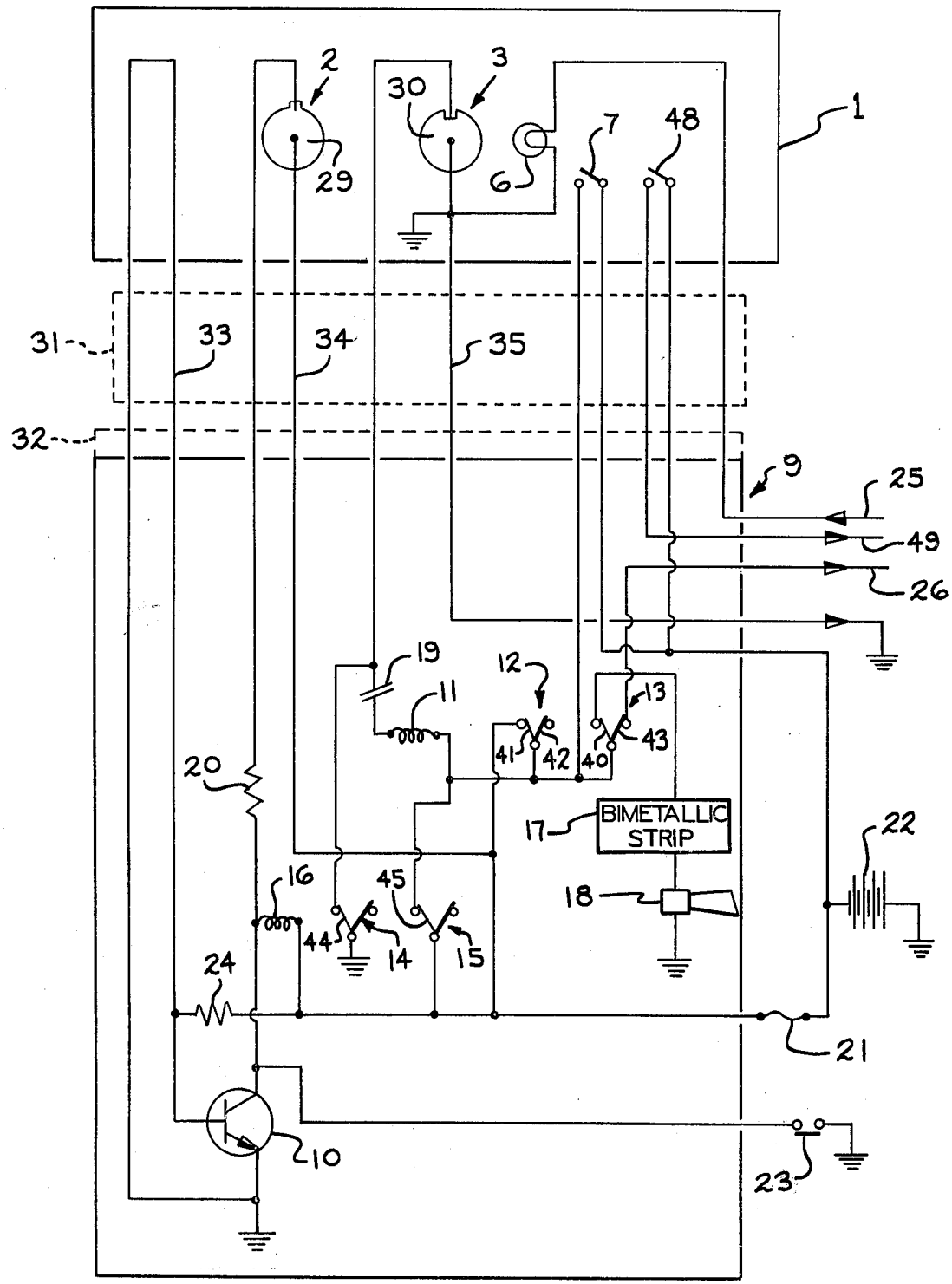
FIG. 4 shows a modification of said circuit.

In the modification illustrated in FIG. 4, the power switch 7 is mounted on the casing 1. The switch 48, which controls the power supply to the relay of the electric starter through the conductor 49, is likewise mounted on the casing 1. The operation is the same as previously described.

Furthermore, it is possible to mount in parallel several microswitches 23 in a manner such that the warning signal be emitted not only when the bonnet or hood of the engine is being opened, but also when the lid of the luggage trunk or a door is being opened. In addition, the scope of the present invention may include the provision of a third contact controlled by the coil of the relay 11, said third contact making the control of the starter relay impossible.

The advantages of the device according to the present invention are as follows:

use of a mere combination of figures or digits instead of a switch key;

impossibility of starting the engine merely by short-circuiting the power switch; and emission of a warning signal not only when a thief attempts to short-circuit the power switch, but also when he cuts the cord connecting the two casings, or opens the bonnet or hood of the engine or the lid of the trunk.

The term "electronic switching device" as used herein is not intended to be limited to transistors. Rather, it is intended to mean any electronic switching or control device having three or more electrodes comprising at least two principle power elctrodes acting to control current flow in the power circuit, the conductivity between the power electrodes being controlled by a control electrode within the device thereby the conductivity of the power circuit is controlled statically or electrically without the movement of mechanical elements within the device. Included within this definition are transistors, vacuum tubes, and other solid state devices in which the turn-ON is accomplished by a control voltage applied to the control electrode and in which the turn-OFF is accomplished automatically in response to the removal of that control voltage.

I claim:

1. An anti-theft device for a vehicle which includes an ignition circuit for the engine of the vehicle as well as a power switch, comprising, in combination:

a first casing disposed in the engine compartment of said vehicle;

a second casing disposed in the dashboard of said vehicle;

a multi-lead electric cable operable and electrically connected between said first casing and said second casing;

means operably and electrically connected to said multi-lead electric cable, said means emitting an alarm signal and switching off said ignition circuit to the engine of said vehicle when a thief attempts to switch on said power switch, or cuts said multi-lead electric cable, or opens the hood of said engine compartment, or opens the lid of the luggage trunk of said vehicle, or opens a door of said vehicle;

said ignition circuit including a vehicle battery, an ignition device and a contactor controlled by electric means;

said power switch comprising a manually-controlled power switch;

said multi-lead electric cable including at least a portion of an electric wire which enables said ignition device to be supplied with electrical energy; and said electric wire starting from a terminal of said vehicle battery, leads to said manually-controlled power switch and from said power switch enters said first casing in said engine compartment wherein it leads to said contactor control by said electric means, and is connected from said contactor through said multi-lead electric cable to enter said second casing disposed in the dashboard of said vehicle, and from there passes again through said multi-lead electric cable back into said first casing in said engine compartment, and from there leads to said ignition device.

2. An anti-theft device according to claim 1, wherein:

said first mentioned means includes and alarm device for emitting said alarm signal; and said contactor controlled by said electric means has three states of equilibrium:

a first operative state when said vehicle is running, at which time said contactor closes a contact between said terminal of said vehicle battery and said ignition device while said power switch is also closed;

a state of rest when said power switch is open; and a third operative state when a thief attempts to switch on said power switch again at the time said contactor is in its position of rest, said third state switching off the circuit which supplies said ignition device enclosing the contact between said terminal of said vehicle battery and said alarm device so as to cause said alarm device to emit said alarm signal.

3. An anti-theft device according to claim 2, including:

a knob mechanism located on said second casing disposed in the dashboard of said vehicle;

said knob mechanism being used to select between the two first states of equilibrium of said contactor; and said knob mechanism being adapted to take several positions, only one position of which makes it possible to pass from one state to the other of said contactor, said one position corresponding to said state of rest, while all the other positions correspond to said first state.

4. An anti-theft device according to claim 2, wherein:

said contactor comprises a two-contact relay; and said first mentioned means includes a bimetallic strip which allows, at the end of a predetermined period of time, returning said contactor to its state of rest when it is in said third state.

5. An anti-theft device for a vehicle which includes an ignition circuit for the engine of the vehicle as well as a power switch, comprising, in combination:

a first casing disposed in the engine compartment of said venicle;

a second casing disposed in the dashboard of said vehicle;

said ignition circuit includes a vehicle battery, an ignition device and a contactor controlled by electric means;

said power switch comprises a manually-controlled power switch;

a multi-lead electric cable operably and electrically connected between said first casing and said second casing;

said multi-lead electric cable includes at least a portion of an electric wire which enables said ignition device to be supplied with electrical energy;

said electric wire starts from a terminal of said vehicle battery, leads to said manually-controlled power switch and from said power switch enters said first casing in said engine compartment wherein it leads to said contactor control by said electric means, and is connected from said contactor through said multi-lead electric cable to enter said second casing disposed in the dashboard of said vehicle, and from there passes again through said multi-lead electric cable back into said first casing in said engine compartment, and from there leads to said ignition device;

means operably and electrically connected to said multi-lead electric cable, said means emitting an alarm signal and switching off said ignition circuit to the engine of said vehicle when a thief attempts to switch on said power switch, or cuts said multi-lead electric cable, or opens the hood of said engine compartment, or opens the lid of the luggage trunk of said vehicle, or opens a door of said vehicle;

said first mentioned means includes an alarm device for emitting said alarm signal;

said contactor controlled by said electric means has three states of equilibrium:

a first operative state when said vehicle is running, at which time said contactor closes a contact between said terminal of said vehicle battery and said ignition device while said power switch is also closed;

a state of rest when said power switch is open;

a third operative state when a thief attempts to switch on said power switch again at the time said contactor is in its position of rest, said third state switching off the circuit which supplies said ignition device enclosing the contact between said terminal of said vehicle battery and said alarm device so as to cause said alarm device to emit said alarm signal;

a knob mechanism located on said second casing disposed in the dashboard of said vehicle;

said knob mechanism being used to select between the two first states of equilibrium of said contactor;

said knob mechanism being adapted to take several positions, only one position of which makes it possible to pass from one state to the other of said contactor, said one position corresponding to said state of rest, while all the other positions correspond to said first state;

a second knob mechanism located on said second casing; and said first mentioned means includes additional electric circuit which shifts said contactor to said third state when it is in its state of rest, such shifting taking place when a thief attempts to open the engine hood or the luggage trunk;

said second knob mechanism neutralizing said shifting when repairs have to made on the engine of said vehicle;

said second knob mechanism being adapted to take several positions only one positin of which corresponds to said neutralizing action; and said additional electric circuit also shifting said contactor into said third state when it is in its state of rest as soon as said multi-lead electric cable connecting said first and second casings is cut.

6. An anti-theft device according to claim 5, wherein:

said additional electric circuit includes a two-contact relay and a solid state electronic switching device;

said solid state electronic switching device controlling the supply of electrical power to said two-contact relay;

said solid state electronic switching device being blocked as long as said multi-lead electric cable has not been cut;

said solid state electronic switching device being in a conductive state when said multi-lead electric cable has been cut, and such state supplying said relay with electric power, said relay in turn supplying the relay of said contactor which thereupon shifts from its state of rest to its third state;

said additional electric circuit being controlled by at least two microswitches, one of which closes when the engine hood and the other of which closes when the lid of the luggage trunk of the vehicle is opened.

7. An anti-theft device according to claim 5, wherein:

said first and second knob mechanisms located on said second casing are provided with skirts bearing numbers along their peripheries such that only the correct combination of such numbers will permit the engine of said vehicle to be started.

8. An anti-theft device according to claim 7, wherein:

said first casing disposed in said engine compartment of said vehicle contains the aforementioned relays, said solid state electronic switching device, and said alarm device;

said second casing on the dashboard is provided with a control light supplied from a lighting circuit for said dashboard, said control light making it possible to read in the dark said figures on said skirts of said first and second knob mechanisms.

* * * * *